Dec. 17, 1957          L. BONO          2,816,807

SUPPORTING DEVICE FOR THE BELT OF SEWING MACHINES

Filed Aug. 4, 1954          2 Sheets-Sheet 1

INVENTOR.
LUIGI BONO
BY

Dec. 17, 1957  L. BONO  2,816,807
SUPPORTING DEVICE FOR THE BELT OF SEWING MACHINES
Filed Aug. 4, 1954  2 Sheets-Sheet 2
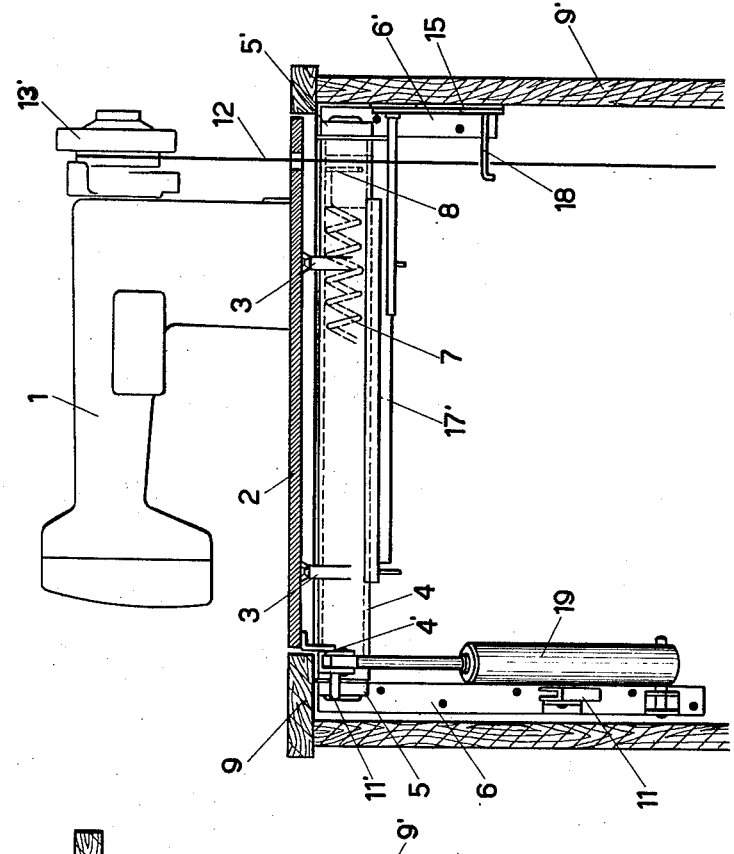
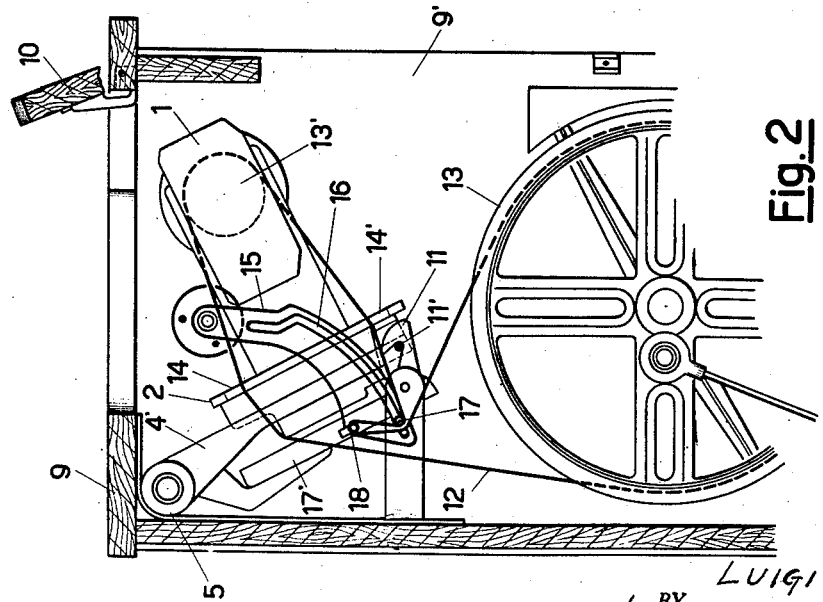
INVENTOR.
LUIGI BONO
BY

United States Patent Office 2,816,807
Patented Dec. 17, 1957

2,816,807

SUPPORTING DEVICE FOR THE BELT OF SEWING MACHINES

Luigi Bono, Pavia, Italy, assignor to Vittorio Necchi Societa per Azioni, Pavia, Italy Application August 4, 1954, Serial No. 447,816

Claims priority, application Italy April 10, 1954

1 Claim. (Cl. 312—30)

There are known tables or cabinets for supporting sewing machines, which are provided inside with a pedal system for actuating the belt of the sewing machine, as well as means for retracting the machine into the interior of the cabinet when it is not used.

It is obvious that during the retracting of the machine into the cabinet, the belt connecting the flywheel actuated by the pedal system, with the handwheel of the machine, becomes loose and goes out of place so that if the machine has to again assume its working position, the belt has to be put into the actuation position in the groove of the flywheel and this operation is not very easy for inexperienced operators.

It is an object of the present invention to provide a tensioning device adapted to retain the belt in its actuation position and not to allow slipping from the rim groove during the retracting of the machine into the cabinet, eliminating the inconvenience described above.

The device of the present invention is characterized in that it is formed of a lever pivoted on one of the shoulders of the cabinet, and rotated by a pin rigid with the base of the machine, and engaged in a groove of suitable shape provided in said lever.

A curved spindle fixed to the lever comes into contact with one section of the belt tensioning it as the machine is being retracted in the cabinet.

It is a further object of the invention to afford a particular shape of the cam groove so as to enable said lever to follow any determined rate of movement.

It is a further characteristic of the invention that if the machine is in operation the spindle is removed from the belt so as to avoid wearing it out and rendering it hard in operation.

The following description with reference to the drawings will make the characteristics of the invention more fully clear.

Fig. 2 shows the same section with the machine in retracted position, in the cabinet, with the belt tensioned.

Fig. 3 is a section along the section line III—III of Fig. 1.

Figure 1:
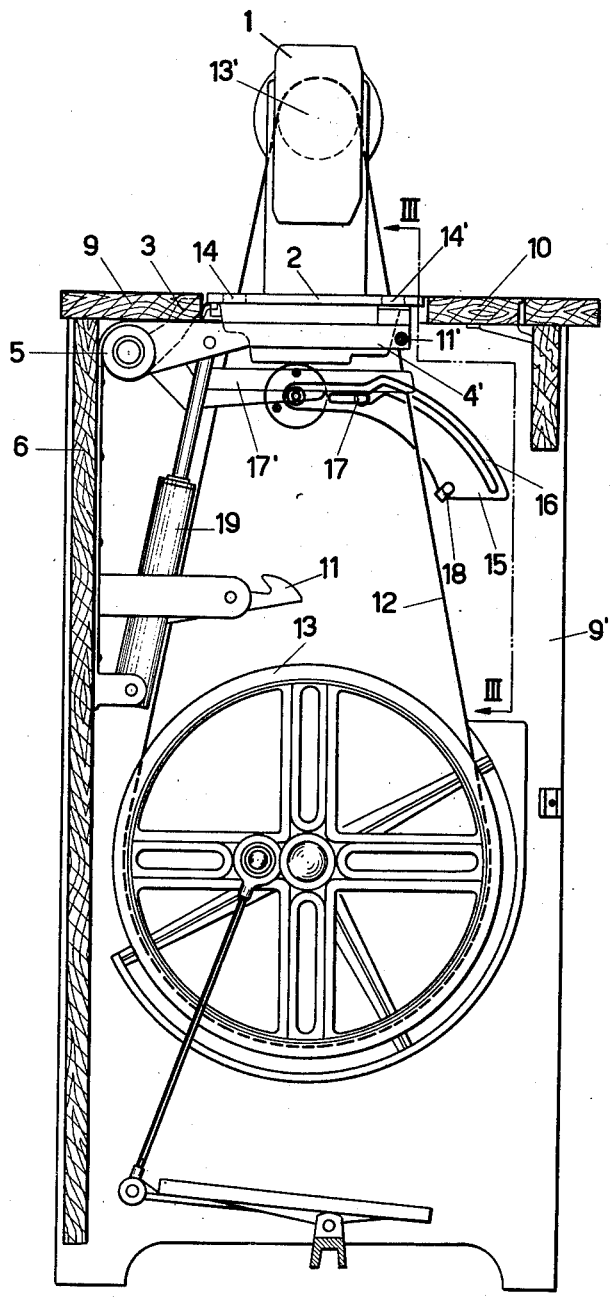
Fig. 1 shows a cross-section of the cabinet, with the tensioning device put out of the way of the belt and with the machine in working position.

The head 1 of the machine, mounted on the base 2, is fulcrumed by means of the two hinges 3 to a tubular member 4 pivoted on the cabinet about the hubs 5 and 5' respectively rigid with the members 6 and 6' fixed to the cabinet. Within said tube there is a helical spring 7 one end of which is fixed to the end 8 of the pipe 4 while the other is fixed to the hub 5.

The traverse 4' for supporting the machine is rigid with said tube 4.

Said spring 7 conveniently loaded supports the head of the machine in working position without any aid of further supporting means. In the front portion of the plane of the table 9 there is hinged a small board 10 which in the position of Fig. 1 is flush with the base 2 and with the plane of the table 9.

If the head 1 is to be lowered into the cabinet, the board 10 has to be lifted as in Fig. 2, and the head 1 has to be pressed to overcome the action of the spring 7 and so the head is rotated about the tube 4 until a suitable stop 11 provided inside the cabinet, engages with the pin 11' fixed to the traverse 4', thus retaining the machine in retracted position.

The actuating belt 12 connecting the flywheel of the pedal system with the handwheel 13' of the machine, passes through the slots 14 and 14' provided in the base 2 of the machine. On the shoulder 9' of the cabinet there is pivoted the lever 15 having a cam groove 16 within which there is engaged the pin 17 fixed to the oil-shield 17' which in turn is rigid with the tubular member 4.

To the lever 15 there is fixed the curved spindle 18 which is the member for contacting the belt 12 during the retracting of the head into the cabinet.

Hence on rotating the machine inwards from the position of Fig. 1 to that of Fig. 2 about the tubular member 4, the pin 17 engaged in the groove 16 rotates the lever 15 according to the desired rate of movement and, consequently, the spindle 18, which comes into contact with the belt 12 recovering those sections thereof that are being yielded as the head is being lowered. When the latter has reached its retracted position in the cabinet, the belt 12 is wound up about the flywheel and the handwheel as in Fig. 2.

Inversely, if one wants to bring the machine again from the retracted position to the working position, one disengages the stop 11 from the pin 11'; then the machine stressed by the spring 7 rotates upwards conveniently braked by the hydraulic group of the cylinder and piston 19 connected to the traverse 4' and assumes the working position indicated in Fig. 1.

Obviously during this operation the belt returns gradually to the right position without ever leaving the grooves of the flywheel 13 and of the handwheel 13'.

Of course the arrangement described is only by way of example, and the device may be embodied with modifications of the various members described, without departing from the scope of the present invention.

The device for retracting and withdrawing the machine, composed of the supporting spring contained in the tubular member, of the stop inside the cabinet and of the hydraulic brake, forms the subject matter of the Italian patent application No. 23,159, filed April 10, 1954.

What I claim is:

In a sewing machine tiltably mounted on a cabinet with a pedal drive, a driving pulley mounted on said cabinet, a driving belt engaging said pulley for actuating said machine and a device for maintaining said belt taut when the machine is tilted down into said cabinet comprising an arm having a slot therein pivoted on said cabinet, a belt retaining member on said arm bearing against said belt when said arm oscillates, and a pin fixed on said sewing machine engaged in said slot to swing said arm through a greater arc than said pin and engaging said belt when said arm oscilaltes whereby tilting down of the machine causes said arm to oscillate and urge said belt retaining member against said belt forming a loop on said pin.

References Cited in the file of this patent

UNITED STATES PATENTS 1,057,809     Diehl et al. _____ Apr. 1, 1913

FOREIGN PATENTS 360,180     Germany _____ Sept. 30, 1922
562,096     Germany _____ Oct. 31, 1932